(12) United States Patent
Gao et al.

(10) Patent No.: US 9,047,682 B2
(45) Date of Patent: Jun. 2, 2015

(54) METHOD AND SYSTEM FOR IMAGE PROCESSING

(71) Applicant: TENCENT TECHNOLOGY (SHENZHEN) COMPANY LIMITED, Shenzhen, Guangdong (CN)

(72) Inventors: Feng Gao, Shenzhen (CN); Yuan Huang, Shenzhen (CN); Jia Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/078,398

(22) Filed: Nov. 12, 2013

(65) Prior Publication Data

US 2014/0072243 A1    Mar. 13, 2014

Related U.S. Application Data

(63) Continuation of application No. PCT/CN2012/084410, filed on Nov. 9, 2012.

(30) Foreign Application Priority Data

Nov. 21, 2011    (CN) .......................... 2011 1 0370980

(51) Int. Cl.
     *G06T 3/40*        (2006.01)
     *G06T 11/60*      (2006.01)

(52) U.S. Cl.
     CPC ............... *G06T 3/4007* (2013.01); *G06T 11/60* (2013.01)

(58) Field of Classification Search
     CPC ... G06T 3/4007; G06T 11/60; G06F 17/3028; G06F 2209/5022; G06F 2209/509; G06F 9/5072; G06F 2203/011; G06F 3/011; G06F 3/0346

USPC ......... 382/300, 237, 293, 299, 291, 235, 236, 382/163, 232

See application file for complete search history.

(56) References Cited

U.S. PATENT DOCUMENTS 5,694,604 A * 12/1997 Reiffin .......................... 718/107
6,377,261 B1 * 4/2002 Fernandez et al. ............ 345/467
(Continued)

FOREIGN PATENT DOCUMENTS

CN           1519713 A      8/2004
CN      101340595 A      1/2009
(Continued)

OTHER PUBLICATIONS

International Search Report in international application No. PCT/CN2012/084410, mailed on Feb. 28, 2013.
(Continued)

*Primary Examiner* — Mekonen Bekele
(74) *Attorney, Agent, or Firm* — Oppedahl Patent Law Firm LLC

(57) ABSTRACT

The disclosure provides a method for image processing, including: loading and decrypting an image file to obtain an original image, and saving the original image; shrinking the original image to obtain a pending image with a preset resolution, and saving the pending image; editing the pending image and previewing the pending image in real time; and editing the original image after the real-time previewing. The disclosure also provides a system for image processing. the disclosure can increase efficiency of real-time preview at the time of image editing.

8 Claims, 2 Drawing Sheets

(56) References Cited

U.S. PATENT DOCUMENTS

| | | | |
|---|---|---|---|
| 6,532,077 | B1 | 3/2003 | Arakawa |
| 7,853,074 | B2* | 12/2010 | Mischler ........................ 382/163 |
| 7,992,119 | B1* | 8/2011 | Iotov et al. ..................... 716/119 |
| 8,441,524 | B2* | 5/2013 | Yahagi ............................. 348/51 |
| 8,478,074 | B2* | 7/2013 | Goel et al. ..................... 382/293 |
| 8,724,981 | B2* | 5/2014 | Itoh ................................. 396/95 |
| 8,725,800 | B1* | 5/2014 | Chan et al. .................... 709/203 |
| 2005/0144653 | A1* | 6/2005 | Creamer et al. .............. 725/148 |
| 2008/0008392 | A1* | 1/2008 | Goel et al. ..................... 382/232 |
| 2009/0002178 | A1* | 1/2009 | Guday et al. ................ 340/573.1 |
| 2013/0191880 | A1* | 7/2013 | Conlan et al. ..................... 726/1 |
| 2014/0136611 | A1* | 5/2014 | Chan et al. .................... 709/203 |
| 2014/0181484 | A1* | 6/2014 | Callister et al. ............... 712/229 |
| 2014/0269912 | A1* | 9/2014 | Sullivan ................... 375/240.12 |

FOREIGN PATENT DOCUMENTS

| | | | | |
|---|---|---|---|---|
| CN | 102074221 A | * | 5/2011 | .............. G09G 5/00 |
| CN | 102110112 A | | 6/2011 | |

OTHER PUBLICATIONS

English Translation of the Written Opinion of the International Search Authority in international application No. PCT/CN2012/084410, mailed on Feb. 28, 2013.

* cited by examiner

METHOD AND SYSTEM FOR IMAGE PROCESSING

CROSS REFERENCE TO RELATED APPLICATIONS

This is a continuation application of International Patent Application No.: PCT/CN2012/084410, filed on Nov. 9, 2012, which claims priority to Chinese Patent Application No.: 2011103709800 filed on Nov. 21, 2011, the disclosure of which is incorporated by reference herein in its entirety.

TECHNICAL FIELD

The disclosure relates to image processing techniques, in particular to a method and system for image processing.

BACKGROUND

In image processing techniques, editing and batch processing of images are the most basic and commonly used techniques. Currently, many image processing tools offer single-image editing and multi-image batch processing.

Single-image editing includes conventional adjustments for image appearance such as adjustment of brightness and contrast, as well as some special image processing effects. When an image is edited using image processing tools, only after one or more editing parameters have been chosen will the image enter editing adjustment phase and an icon and text will prompt the user to wait. The user may have to wait a long time before the final result of editing is shown. The problems above are due to the fact that when editing parameters are adjusted in single-image editing and, real-time preview may prove to be unfeasible if the original image is too large and the speed too slow to process it in real time and show the result immediately (real-time preview); now, the user's experience will not be seamless without real-time preview, and he/she will lack a certain degree of control in the editing and processing of the image.

Batch processing of images is a common technique to improve work efficiency, and it can reduce considerably the number of repetitive operations that the user has to perform. Some image processing tools only provide a few editing functions for batch processing, such as format conversion, resizing, renaming, but they do not affect the content of the image. Although some image processing tools do provide batch editing functions for batch processing of image content, such as batch addition of image frames, watermarks etc., they do not provide real-time preview, and batch editing outcome is shown to the user only after he/she has chosen a function such as batch generation of images. The speed of batch processing is often slow particularly when the number of images is large. If the user is not satisfied with the batch editing outcome after a long wait, he/she has to iterate and batch edit again, which will increase the workload and the usage time; furthermore, some image processing tools do not allow the user to set the batch parameters, but they perform the adjustment automatically, and they do not provide real-time preview.

In short, existing image processing techniques have drawbacks in terms of real-time image editing and preview, and do not allow previewing the outcome of image batch processing in real time.

SUMMARY

Accordingly, the disclosure aims to provide a method and system for image processing, so as to overcome drawbacks of existing image processing techniques in real time editing and preview.

To achieve the objective, the technical solution of the disclosure is implemented as follows.

The disclosure provides a method for image processing, the method includes:

loading and decrypting an image file to obtain an original image, and saving the original image:

shrinking the original image to obtain a pending image with a preset resolution, and saving the pending image;

editing the pending image and previewing the pending image in real time; and editing the original image after the real-time preview.

The disclosure further provides a system for image processing, the system includes:

a loading decrypting unit configured to load and decrypt an image file to obtain an original image;

a resizing unit configured to shrink the original image to obtain a pending image with a preset resolution;

a saving unit configured to save the original image and the pending image; and an editing previewing unit configured to edit the pending image, preview the pending image in real time, and edit the original image after the real-time preview.

The method and system for image processing according to the disclosure mainly shrink a large original image, and adopt a way of separate processing of images, and specifically include: first loading and saving the original image; then performing shrink processing on the original image, and performing editing and real-time previewing on the shrunken pending image, and only when effect of the preview is satisfying, editing the original image after real-time preview is completed. When the real-time previewing is performed, the editing is performed on the shrunken pending image, while the final image editing is performed on the original image, therefore this way of separate processing based on image shrink increases efficiency of real-time preview. In addition, the original image can be further shrunken so as to assure efficiency of real-time preview in the case of batch processing.

DETAILED DESCRIPTION

Figure 1:
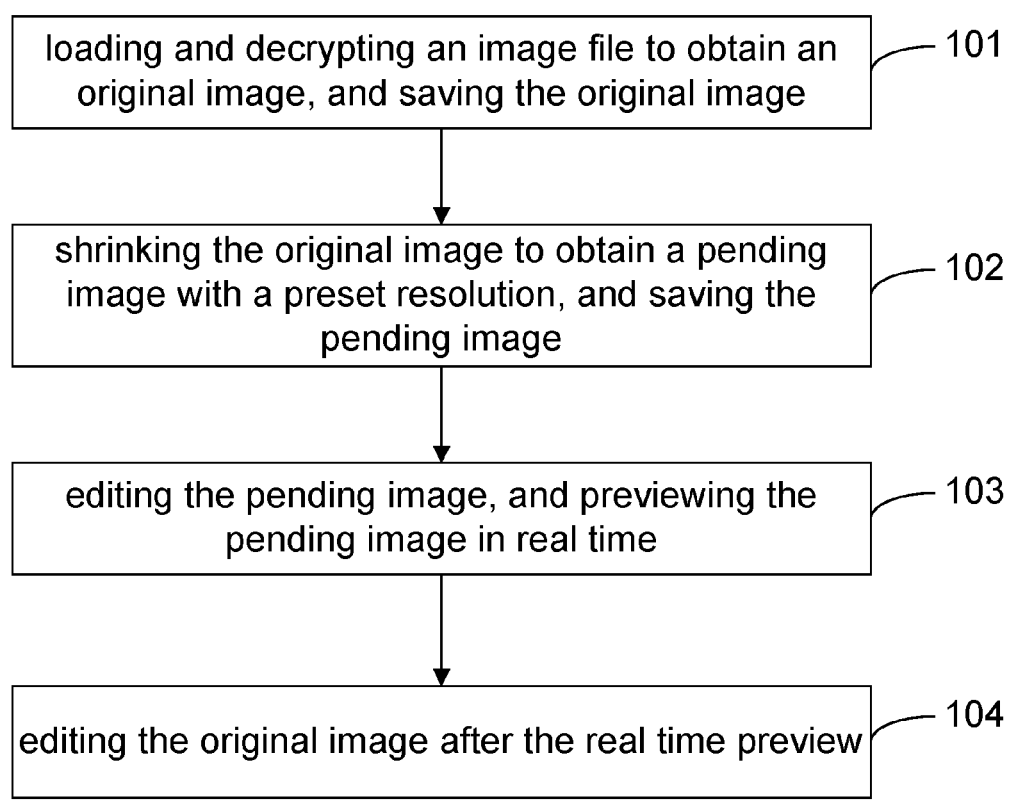
FIG. 1 is a flowchart illustrating a method for image processing according to the present disclosure.

As the image processing speed is at the bottleneck of development, in order to increase efficiency of real-time preview, the basic concept of the method for image processing with real-time editing and preview according to the disclosure is that: the large original image is shrunken, edited and previewed in real time. As shown in FIG. 1, the method includes the following steps.

Step 101: loading and decrypting an image file to obtain an original image, and saving the original image.

In image processing of the disclosure, it is first required to load and decrypt the image file, and then save the obtained original image.

Furthermore, if the image supports partial decryption, a part of the image may be decrypted as required when the image is being loaded, and a part of the original image can be obtained.

As the part of the original image obtained by partial decryption is smaller than the entire original image obtained by complete decryption, compared with subsequent shrinking and saving of the entire original image, the time spent in performing the shrinking on the part of the original image is reduced, and the time for saving is also reduced.

Step 102: shrinking the original image to obtain a pending image with a preset resolution, and saving the pending image.

Preferably, the disclosure adopts the interpolation algorithm in image processing to shrink a large original image to a preset resolution, since the image generated by interpolation has a higher fidelity and better visual effect. The implementation of image resizing by interpolation is an existing technique and is not elaborated here. Of course, other image resizing techniques may be adopted depending on the practical requirement.

Wherein, the preset resolution may be set according to the practical application circumstance. In the case of batch processing, as the number of images is large, in order to assure efficiency of real-time preview, the original image may be further shrunken. For example, in view of the situation that the resolution of the computer monitor is often smaller than the real size of the original image, the preset resolution may be set to be about 1000×1000, and to be about 500×500 during batch processing.

Step 103: editing and previewing the pending image in real time.

As the pending image, in particular the pending image obtained in the case of partial decryption, is smaller than the original image, therefore, the problem of low efficiency of real-time preview caused by an oversized image is avoided when editing is performed on the pending image.

When image editing is performed, a foreground thread adjusts image editing parameters, and triggers a first background thread to perform a corresponding editing operation on the pending image according to the adjusted image editing parameters. An effect image is obtained after the editing operation is completed. The first background thread notifies the foreground thread to perform user interface update, which is mainly about showing the edited effect image on the user interface for real-time preview.

Furthermore, during batch processing of images, the first background thread performs a corresponding editing operation on multiple pending images one by one; accordingly, the foreground thread shows the effect image s on the user interface one by one.

Step 104: editing the original image after the real-time preview.

After real-time preview, the user executes a saving operation via the foreground thread when the effect of image editing is determined to be satisfying according to the effect image previewed in real time, at this time, the foreground thread will trigger a second background thread to perform a corresponding editing operation on the original image according to the editing operation performed on the pending image by the first background thread.

Moreover, during batch processing of images, the second background thread performs a corresponding editing operation on multiple original images one by one.

Since the original image is large and takes long time to be processed, the foreground thread will be in a waiting state, during which operations such as adjustment of the editing parameter cannot be performed. Only after the second background thread completes the editing operation on the original image, does the second background thread notify the foreground thread to leave the waiting state and enter again a state in which the editing parameter is adjustable, so that a new round of image editing and real-time previewing can be performed.

According to the method for image processing with real-time editing and preview provided by the present disclosure, the process of single-image editing is as follows:
1. loading and decrypting the image file to obtain an original image;
2. performing shrinking on the original image to obtain a corresponding pending image;
3. adjusting, by the user, image editing parameters via a foreground thread according to the pending image shown on the interface;
4. triggering, when the image editing parameters are adjusted, a first background thread by the foreground thread to perform a corresponding editing operation on the pending image;
5. triggering, after the editing operation is completed, the foreground thread by the first background thread to show on the user interface the effect image obtained by the editing operation;
6. previewing the effect image by the user, and when the user feels satisfied with the effect of preview, executing a saving operation via the foreground thread after the real-time preview, during which triggering a second background thread by the foreground thread to perform a corresponding editing operation on the original image, and then saving the edited original image.

According to the method for image processing with real-time editing and previewing provided by the present disclosure, the process of batch processing of images is as follows:
1. loading and decrypting the image files one by one to obtain multiple original images;
2. performing shrinking on the original images in a unified manner to obtain corresponding multiple pending images;
3. adjusting, by the user, image editing parameters for batch processing via a foreground thread according to the multiple pending images shown on the interface, for example, adjusting parameters for addition of an image frame, watermark, which means performing image frame addition and watermark addition on the multiple pending images;
4. triggering, when the image editing parameters are adjusted, a first background thread by the foreground thread to perform a corresponding editing operation on the multiple pending images, in particular, performing, by the first background thread, the editing operation on the multiple pending images one by one;
5. triggering, after the editing operation is completed, the foreground thread by the first background thread to show on the user interface one by one multiple effect images obtained by the editing operation, for example: upon completing editing of the first pending image by the first background thread, triggering the foreground thread by the first background thread to show the corresponding effect image; meanwhile, starting, by the first background thread, to perform the editing operation on the second pending image, and the other images can be processed in a similar way;
6. previewing, by the user, the effect images one by one, and when the user feels satisfied with the effect of preview, executing a saving operation via the foreground thread after the real-time preview, wherein executing the saving operation on multiple images one by one, or executing the saving operation on multiple images in a unified manner after all previews are completed, during which, triggering a second background thread by the foreground thread to perform a corresponding editing operation on multiple original images one by one.

Figure 2:
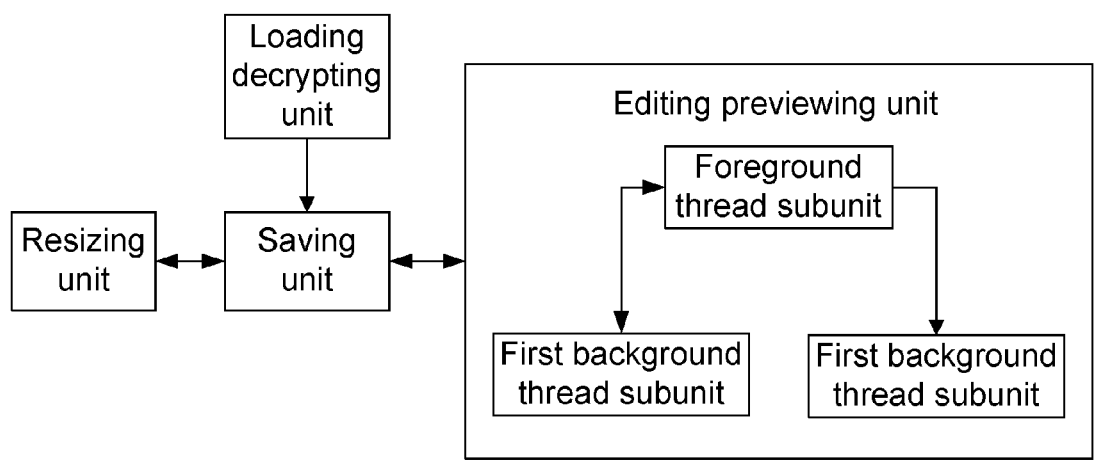
FIG. 2 is a diagram illustrating the structure of a system for image processing according to the present disclosure.

In order to implement the method mentioned above, as shown in FIG. 2, the present disclosure provides a system for image processing, including:

a loading decrypting unit configured to load and decrypt an image file to obtain an original image;

a resizing unit configured to shrink the original image to obtain a pending image with a preset resolution;

a saving unit configured to save the original image and the pending image; and an editing previewing unit configured to edit the pending image and preview the pending image in real time, as well as to edit the original image after the real-time preview.

Furthermore, the resizing unit is configured to shrink the original image by an interpolation algorithm to obtain a pending image with a preset resolution;

Furthermore, the loading decrypting unit is configured to load and decrypt the image file corresponding to the original image to obtain the original image before the resizing unit shrinks the original image to obtain a pending image with a preset resolution;

Correspondingly, the saving unit is further configured to save the original image obtained by decryption.

Furthermore, the loading decrypting unit may be configured to decrypt the entire image file or part of the image file.

The editing previewing unit includes a foreground thread subunit and a first background thread subunit, wherein: the foreground thread subunit is configured to adjust mage editing parameters and trigger the first background thread subunit to execute an editing operation; and the first background thread subunit is configured to perform a corresponding editing operation on the pending image according to the adjusted image editing parameters to obtain an effect image, and notify the foreground thread subunit to show the effect image on a user interface for real-time preview.

The foreground thread subunit is further configured to execute a saving operation after the real-time preview, and trigger a second background thread subunit to execute an editing operation.

Correspondingly, the editing previewing unit further includes the second background thread subunit configured to perform a corresponding editing operation on the original image according to the editing operation performed on the pending image by the first background thread subunit; and correspondingly, the saving unit is further configured to save the edited original image.

What described above is merely the preferred embodiments of the disclosure and is not intended to limit the scope of protection of the present disclosure.

What is claimed is:

1. A method for image processing, comprising:
   loading and decrypting an image file to obtain an original image, and saving the original image;
   shrinking the original image to obtain a pending image with a preset resolution, and saving the pending image;
   editing the pending image and previewing the pending image in real time; and
   editing the original image after the real-time preview of the pending image,
   wherein editing the pending image and previewing the pending image in real-time comprises:
   adjusting, by a foreground thread, an image editing parameter and triggering a first background thread to perform a corresponding editing operation on the pending image according to the adjusted image editing a parameter; and
   obtaining an effect image after the editing operation is completed, and notifying, by the first background thread, the foreground thread to show the effect image on a user interface for real-time preview.

2. The method according to claim 1, wherein shrinking the original image to obtain a pending image with a preset resolution comprises: shrinking the original image to the preset resolution by an interpolation algorithm to obtain a corresponding pending image.

3. The method according to claim 1, wherein loading and decrypting an image file comprises: decrypting an entire image file to obtain an entire original image; or decrypting part of the image file to obtain part of the original image.

4. The method according to claim 1, wherein editing the original image comprises:
   when effect of the real-time preview is determined to be satisfying according to the effect image, executing, by the foreground thread, a saving operation and triggering a second background thread to perform a corresponding editing operation on the original image according to the editing operation performed on the pending image by the first background thread.

5. A system for image processing, comprising:
   a loading decrypting unit configured to load and decrypt an image file to obtain an original image;
   a resizing unit configured to shrink the original image to obtain a pending image with a preset resolution;
   a saving unit configured to save the original image and the pending image; and
   an editing previewing unit configured to edit the pending image, preview the pending image in real time, and edit the original image after the real-time preview of the pending image,
   wherein the editing previewing unit comprises a foreground thread subunit and a first background thread subunit, wherein:
   the foreground thread subunit is configured to adjust an image editing parameter and trigger the first background thread subunit to execute an editing operation; and
   the first background thread subunit is configured to perform a corresponding editing operation on the pending image according to the adjusted image editing parameter to obtain an effect image, and notify the foreground thread subunit to show the effect image on a user interface for real-time preview.

6. The system according to claim 5, wherein the resizing unit is further configured to shrink the original image through an interpolation algorithm to obtain a pending image with a preset resolution.

7. The system according to claim 5, wherein the loading decrypting unit is further configured to decrypt an entire image file or to decrypt part of the image file when loading and decrypting the image file.

8. The system according to claim 5, wherein the foreground thread subunit is further configured to execute a saving operation after the real-time preview, and trigger a second background thread subunit to execute an editing operation;
   the editing previewing unit further comprises the second background thread subunit configured to perform a corresponding editing operation on the original image according to the editing operation performed on the pending image by the first background thread subunit; and
   the saving unit is further configured to save the edited original image.

* * * * *